Nov. 4, 1947.  A. V. CLITES  2,430,327
CORN CRIB UNLOADING MEANS
Filed Jan. 1, 1945  2 Sheets-Sheet 1

Inventor
A. V. Clites
By Arthur H. Sturges
Attorney

Nov. 4, 1947.  A. V. CLITES  2,430,327
CORN CRIB UNLOADING MEANS
Filed Jan. 1, 1945  2 Sheets-Sheet 2
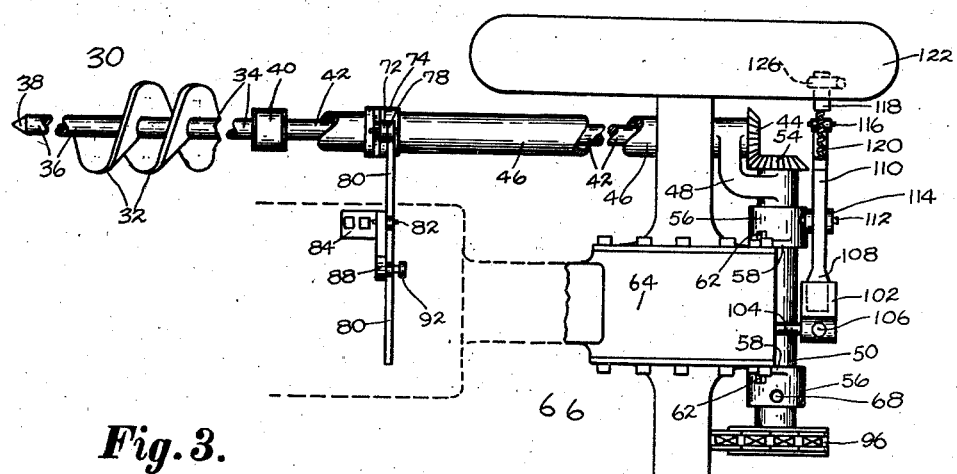
Fig. 3.
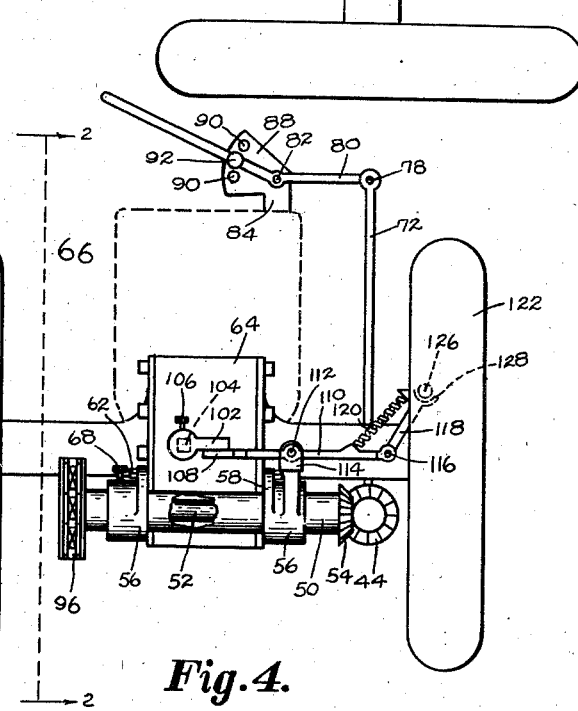
Fig. 4.
Fig. 5.
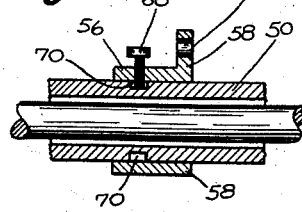
A. V. Clites Inventor
By Arthur H. Sturges
Attorney Patented Nov. 4, 1947

2,430,327

UNITED STATES PATENT OFFICE 2,430,327

CORNCRIB UNLOADING MEANS

Alfred V. Clites, Hastings, Iowa

Application January 1, 1945, Serial No. 570,965

7 Claims. (Cl. 198—233)

The present invention relates to agricultural machinery and more particularly to mechanisms for handling ears of corn and the like, including coal and small grains.

It is an object of the invention to provide a device for removing ears of corn from a corn crib, whereby the heretofore practice of shoveling said ears by manual labor is eliminated, said device also being adapted for removing coal from a bin or box car.

Another object of the invention is to provide a simple mechanism which is adjustable to any conventional type of tractor for utilizing the power of the latter in combination with the new device for said purpose.

A further object of the invention is to provide a new type of worm screw usable for several purposes other than in conjunction with the herein described mechanism.

A still further object of the invention is to provide a jogging mechanism which may be readily attached to a tractor for moving the tractor forwardly intermittently by utilizing the power of the engine of the tractor in conjunction with said mechanism.

Other and further objects and advantages of the invention will be understood from the following detailed description thereof:

In the drawings:

Figure 3 is a top plan view of the parts shown in Figure 2 and in addition thereto, showing a fragment of a worm screw employed.

Figure 4 is an elevational view of the rear end of the tractor and of the parts shown in Figure 3.

Figure 5 depicts, fragmentarily, a portion of a means for attaching the new device to a tractor, said means showing in section.

Figure 1:
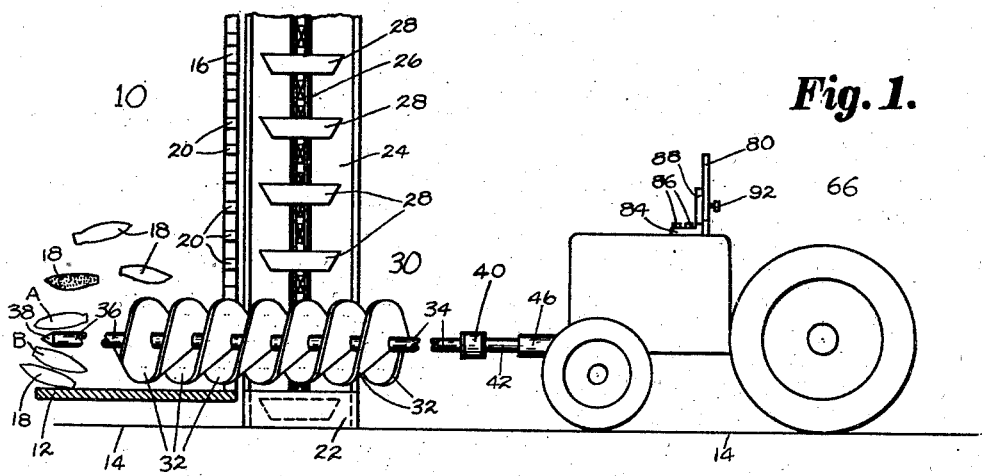
Figure 1 is a side view of the new device, a portion of the corn crib being shown in section, certain parts of the new device being broken away.

It is well known that after ears of corn have been harvested, the ears are usually stored in a corn crib of open-work construction, whereby the air can circulate through said crib and said corn for dehydrating the latter. After dehydration to a desired extent, the corn is then ready for market and as heretofore practiced, the corn has been shoveled out of the crib by the employment of hand labor with a proportional expenditure of time and money and it is an object of the present invention to obviate certain of the undesirable features of the prior practice.

Referring now to the drawings for a more particular description, 10 indicates generally a corn crib, having a floor 12 above the ground 14 and mounted on a foundation or sills, not shown. The crib is provided with oppositely disposed side walls 16, one of the latter being shown in Figure 1. The said side wall 16 consists of spaced-apart dimension lumber whereby the air may circulate through said wall for dehydrating the ears of corn 18 stored within said crib.

A corn crib is usually from ten to one hundred feet long and is provided with doors opening through one of the side walls thereof for the purpose of loading the ears of corn into the crib and removing said ears therefrom, and the new device advantageously utilizes these present fixed conditions which are common to all corn cribs and in the manner later described.

The present invention provides means for operating a worm screw of new type for removing the ears of corn from the crib 10 as later described, and after said ears become removed through the doorway 20 of the crib, said ears fall into a horizontally disposed trough 22, the latter resting upon the ground 14. At one end of the trough, a continuation of the latter is upwardly disposed, said end portion being indicated at 24. Within the trough, including its end portion 24, an endless chain belt 26 is provided which travels over sprocket wheels or rollers, not shown. Spaced apart and secured to the chain or belt 26, conveyor members, slats or paddles 28 are provided and said paddles are so constructed with respect to the chain and the trough that they traverse the horizontal portion of the trough and upwardly of the end inclined portion of the trough so that ears of corn which are carried upwardly fall off the upper end of the portion 24 of the trough into a wagon or truck body for conveyance to an elevator or railway car for transportation. Also, said ears may fall into the hopper of a corn sheller or the like when it is desired to separate the kernels of corn from the cobs and said belt or chain 26 is driven by a suitable means, not shown, such as a gasoline engine; although, if desired, the power of the later described tractor may be so arranged that it drives said endless chain belt.

The invention includes a worm screw, generally indicated at 30. The worm screw includes the helically disposed convolutions 32 which are disposed about the shaft 34 of said screw. The forward free end 36 of the shaft is of substantially cylindrical shape and extends an appreciable distance forwardly and beyond the end convolution of the thread 32 of the worm screw, whereby during revolvable movements of the worm screw and a forward travel of said worm screw and said tractor, the pintle end 38 lodges between the ears of corn A and B and said elongated pintle end is, in substance, journalled between said ears of the heap of ears within the crib 10. In order to facilitate forward movement of the shaft 34, the latter is preferably provided with a terminal sharp point on the pintle end 38, the latter being of conical contour in side elevation.

As thus described, it will be understood that no pillow block or journal bearing made of metal is desired or necessary for the pintle end of the worm shaft 34 since said pintle lodges between ears of corn and may drift about to a certain extent as is desired.

At the rear end of the shaft 34, the latter is connected, by means of a universal joint 40, with a line shaft 42.

The universal joint 40 may be of rubber as shown in Figure 3.

At the rear end of the line shaft 42, the latter is provided with a pinion 44 and said shaft extends through a suitable sleeve or housing 46.

The sleeve or housing 46 is connected, by means of a plate 48, with a similar sleeve or housing 50.

A transversely disposed shaft 52 extends through the sleeve 50, being provided with a pinion 54 and the latter is in constant mesh with the pinion 44 of the shaft 42. The second sleeve or housing 50 extends through bracket hangers 56, each of which is provided with an arm 58.

The upper ends of the arms are each provided with an aperture 60 for receiving therethrough a cap screw 62. The cap screws 62 are received into the threaded apertures of the differential housing 64 of the tractor, generally indicated at 66, the latter being of any conventional type. In the practice of the present invention, two or more of the cap screws are removed from said differential housing and longer cap screws employed for bolting the bracket arms 58 to the tractor. If desired, each bracket hanger 56 may be provided with two or more of the arms 58 and for convenience of illustration, but one arm 58 is illustrated for each hanger.

It will be understood that the second sleeve or housing 50 is rotatable in its bracket hangers 56 and in order to prevent lateral movement of the sleeve 50 with respect to the bracket hanger, at least one of the latter is provided with a set screw 68 which, as best shown in Figure 5, has an end disposed in an annular slot or channel 70 formed in the sleeve 50.

As thus described, it will be noted that the first mentioned sleeve 46, together with its shaft 42 and the universal joint 40, may be swung in a vertical direction for purposes later described and means are provided for moving the housing 46 and universal joint 40 in a vertical direction, said means including a reach-rod 72 having a lower end secured by any suitable means, such as the strap 74, to the housing 46 and through a pivot pin 76.

Figure 2:
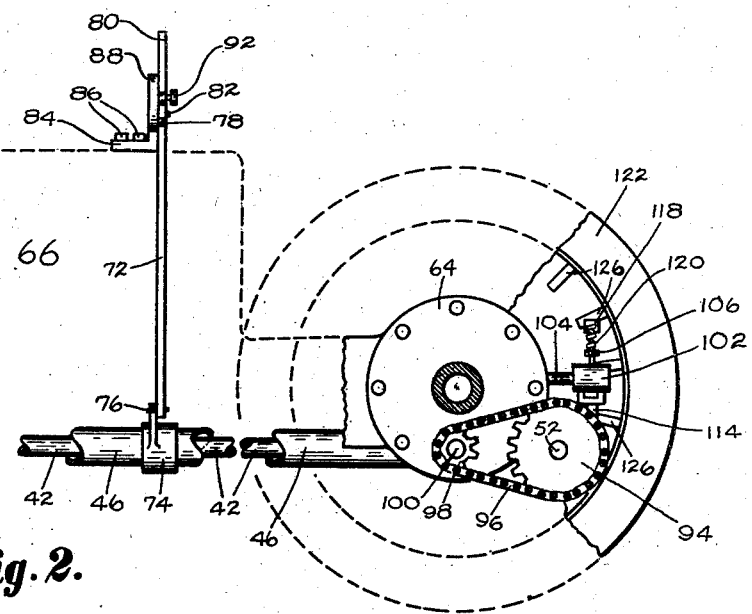
Figure 2 is a vertical section of a rear end portion of a tractor and showing certain portions of the new mechanism cooperatively assembled therewith, the view being taken substantially on the line 2—2 of Figure 4.

As best shown in Figure 4, the upper end of the reach-rod 72 is pivotally connected, as at 78, to a lever 80. The lever is pivotally mounted, as at 82, to a standard 84. As best shown in Figure 2, the standard 84 is secured by means of bolts 86 to any suitable portion of the housing of the engine of the tractor.

The standard is provided with an arm 88, having a row of selective apertures 90 through which a pull-pin 92 is disposed, said pull-pin also being disposed through the lever 80. By this means, the operator, by manipulating the lever 80, may cause the housing 46 to be raised and lowered and maintained in a selected position for purposes later described.

That end of the shaft 50 which is oppositely disposed with respect to the pinion 54 is provided with a sprocket wheel 94.

As best shown in Figure 2, an endless sprocket chain 96 extends over the sprocket 94 and also over a smaller sprocket 98.

The sprocket 98 is secured by any suitable means to a shaft 100, the latter being conventional to many types of tractors, and extending through the differential housing 64 of the tractor. The shaft 100 has a pinion on its inner end, not shown, which is driven by the gears within the housing 64 in a well known manner. As thus described, it will be noted that at times when the operator manipulates a conventional lever and clutch assembly, not shown, said assembly being common to tractors, that a revolvable movement is imparted to the shaft 100 by the engine of the tractor for driving the sprocket chain 96, the shafts 52 and 42, the universal joint 40 and the new type of worm screw employed.

As thus described, it will be understood that at times when the worm screw is disposed within the crib, as shown in Figure 1, and at times when the engine is causing said worm screw to revolve, the ears of corn 18 will be moved outwardly of the crib and into the trough.

Means are provided for utilizing the power of the tractor to jog the tractor and the worm screw forwardly, slowly and intermittently, whereby the pintle end of the worm screw will traverse the crib transversely for unloading practically all of the corn adjacent the door-way of the crib and in line with said door-way transversely of the crib.

Said jogging means include an arm 102 which, as best shown in Figure 4, is secured to the power take-off shaft 104 of the tractor by means of a set screw 106 and in a manner whereby the arm 102 revolves in a clockwise direction with respect to the showing thereof in Figure 4 and in a manner whereby, during each revolution of the arm 102, the latter contacts an end 108 of a lever 110.

As best shown in Figure 4, the lever 110 is pivotally mounted, as at 112, to and between the ears of a support 114. The lower end of the support is welded or otherwise suitably secured to the adjacent bracket hanger 56. The other end of the lever 110 is pivotally attached, as at 116, to a pawl 118 and the upper end of the pawl is urged, by means of a spring 120, toward the adjacent wheel 122 of the tractor.

The wheel may be of any conventional type and provided with a pneumatic tire or the like mounted on a metallic rim of wheel 122.

As best shown in Figure 2, equidistantly spaced apart pins or lugs 126 are secured, by any suitable means such as welding or the like, to the rim of wheel 122.

As best shown in Figure 4, the upper end of the pawl is provided with a notch 128 which engages the pins 126 one at a time progressively.

Each time the arm 102 pushes the end 108 of the lever 110 downwardly, the other end of the lever, together with the pawl 118 is moved upwardly, thus causing the wheel 122 to revolve a distance substantially equivalent to the distance between the centers of the pins 126.

As shown in Figure 4, the pawl 118 is about to push a pin 126 upwardly and as soon as the arm 102 passes by the end 108 of the lever 110, the other end of the lever falls downwardly by gravity, the weight of the pawl being such that it overcomes the urge of the spring 120, thereby permitting the upper end of the pawl to pass below the next adjacent pin 126, whereby the operation is repeated for each revolution of the arm 102 and of the power take-off shaft 104.

Since the power take-off shaft 104 is well known and is common to many types of tractors, a minute description thereof is believed to be not necessary and clutch means (not shown) are provided conventional to the tractor for causing its power take-off shaft 104 to rotate only at desired times.

As thus described, it will be noted that at times when the device is in the position with respect to the crib of corn, as shown in Figure 1, that the engine of the tractor may be started for causing the power of the tractor to force the worm screw inwardly of the crib for removing ears of corn from the latter.

From the foregoing description, it is thought to be obvious that a corn crib unloader constructed in accordance with my invention is particularly well adapted for use by reason of the convenience and facility with which it may be assembled and operated, and it will also be obvious that my invention is susceptible of some change and modification without departing from the principles and spirit thereof and for this reason, I do not wish to be understood as limiting myself to the precise arrangement and formation of the several parts herein shown in carrying out my invention in practice, except as claimed.

I claim:

1. A material handling machine comprising a tractor having a power take-off-shaft, an auxiliary driver-shaft and means for causing the engine of the tractor to rotate said shafts; a worm screw having a free end disposed forwardly of said tractor and an opposite end having a connection with said driver-shaft for rotating said worm; and means for jogging said tractor forwardly for forcing said free end of said worm into a heap of material to be moved during rotation of said worm; said jogging means comprising an annular row of spaced apart lugs disposed on a ground engaging traction wheel of said tractor, a lever-arm connected for rotary movements to said power take-off-shaft, a rocker-arm having an end arranged to be depressed responsive to a rotation of said lever arm, a dog having an end pivotally attached to the other end of said rocker-arm, the other end of said dog being arranged to successively engage said lugs for moving said traction wheel correspondingly.

2. The construction of claim 1 which further includes resilient means for urging said dog toward said lugs.

3. The construction of claim 1 which further includes means for raising and lowering the said opposite end of the worm screw.

4. In a material moving machine, a tractor, a shaft disposed forwardly of and supported by said tractor in approximate parallelism with the tractor, one end of said shaft being rotatably connected to said tractor, said shaft having a pintle end, a major portion of said pintle end being of cylindrical shape and the outer extremity thereof being pointed, and a helical thread disposed about and secured to the longitudinal length of said shaft.

5. In a material moving machine, a tractor, a shaft disposed forwardly of and supported by said tractor in approximate parallelism with the tractor, one end of said shaft being rotatably connected to said tractor, said shaft having a pintle end, a major portion of said pintle end being of cylindrical shape and the outer extremity thereof being pointed, and a helical thread disposed about and secured to the longitudinal length of said shaft, said pintle end being of a length extending beyond the adjacent end of said thread a distance at least equal to the distance between a complete convolution of said thread and a next adjacent convolution.

6. A material handling machine comprising a tractor; a shaft having a universal joint connected to one end thereof; a worm disposed about said shaft and secured thereto, the other end of said shaft extending beyond said worm, said universal joint being drivably interconnected with the engine of said tractor for rotating said worm, said other end being free to move both horizontally and vertically in a heap of material to be moved by said worm.

7. A material moving machine comprising a tractor; a shaft having a free end disposed forwardly of said vehicle, means including a universal joint for drivably interconnecting the opposite end of said shaft with the motor of said vehicle for rotating said shaft; and a helical thread disposed about and secured to the longitudinal length of said shaft, said shaft having an outer pintle end of a length extending beyond the adjacent end of said thread a distance at least equal to the distance between convolutions of said thread, and said shaft having a universal joint between the ends thereof.

ALFRED V. CLITES.

REFERENCES CITED

The following references are of record in the file of this patent:

UNITED STATES PATENTS

| Number | Name | Date |
| --- | --- | --- |
| 113,767 | Hazen | Apr. 18, 1871 |
| 214,929 | Locke et al. | Apr. 29, 1879 |
| 550,152 | Barr | Nov. 19, 1895 |
| 1,300,620 | Joy | Apr. 15, 1919 |
| 1,436,517 | Morrow | Nov. 21, 1922 |
| 1,445,087 | Joy | Feb. 13, 1923 |
| 1,477,212 | Eckertz | Dec. 11, 1923 |
| 2,050,984 | Surdy | Aug. 11, 1936 |
| 2,067,583 | Stark | Jan. 12, 1937 |
| 2,102,330 | Newcomer | Dec. 14, 1937 |
| 2,176,092 | Meduna | Oct. 17, 1939 |
| 2,181,404 | Koppitz et al. | Nov. 28, 1939 |
| 2,233,707 | Nelson | Mar. 4, 1941 |
| 2,355,774 | Baker | Aug. 15, 1944 |

FOREIGN PATENTS

| Number | Country | Date |
| --- | --- | --- |
| 277,174 | Great Britain | Sept. 15, 1927 |